(12) United States Patent
Pratt

(10) Patent No.: US 6,662,633 B2
(45) Date of Patent: Dec. 16, 2003

(54) METHOD AND APPARATUS FOR LOCATING INTERNAL TRANSFER LEAKS WITHIN FUEL CELL STACKS

(75) Inventor: Stephen John Pratt, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 75 days.

(21) Appl. No.: 10/025,202

(22) Filed: Dec. 19, 2001

(65) Prior Publication Data

US 2003/0110837 A1 Jun. 19, 2003

(51) Int. Cl.$^7$ ............................. G01M 3/08; H01M 8/00
(52) U.S. Cl. ..................... 73/40.5 R; 429/13
(58) Field of Search ............... 73/40.5 R, 40, 73/40.7; 429/13; 165/11.1

(56) References Cited

U.S. PATENT DOCUMENTS

| | | | | |
|---|---|---|---|---|
| 4,688,627 A | * | 8/1987 | Jean-Luc et al. | 165/11.1 |
| 5,235,846 A | | 8/1993 | Fanciullo | 73/40.7 |
| 5,763,113 A | * | 6/1998 | Meltser et al. | 429/13 |
| 6,009,745 A | * | 1/2000 | Shaw et al. | 73/40.7 |
| 6,062,068 A | * | 5/2000 | Bowling | 73/40 |
| 6,289,723 B1 | | 9/2001 | Leon | 73/49.8 |
| 6,492,043 B1 | * | 12/2002 | Knights et al. | 429/13 |
| 2003/0056572 A1 | * | 3/2003 | Werner | 73/40.7 |

FOREIGN PATENT DOCUMENTS

| | | |
|---|---|---|
| DE | 196 49 434 | 1/1998 |
| JP | 63-32866 | 2/1988 |
| JP | 01-204367 | 8/1989 |
| JP | 03-250564 | 11/1991 |
| JP | 08-167423 | 6/1996 |
| JP | 08-185879 | 7/1996 |
| JP | 2001-023665 | 1/2001 |
| WO | WO 00/39870 | 7/2000 |

OTHER PUBLICATIONS

Abstract of DE 196 49 434, espacenet database, Jan. 15, 1998.
Abstract of JP 2001–023665, espacenet database, Jan. 26, 2001.
Abstract of JP 08–185879, espacenet database, Jul. 16, 1996.
Abstract of JP 08–167423, espacenet database, Jun. 25, 1996.
Abstract of JP 03–250564, espacenet database, Nov. 8, 1991.
Abstract of JP 01–204367, espacenet database, Aug. 16, 1989.
Abstract of JP 63–032866, espacenet database, Feb. 12, 1988.

* cited by examiner

*Primary Examiner*—Hezron Williams
*Assistant Examiner*—Jay L. Politzer
(74) *Attorney, Agent, or Firm*—Seed IP Law Group PLLC

(57) ABSTRACT

A method for locating an internal transfer leak in a fuel cell stack by applying a substantially constant gas pressure difference between a first fluid stream passage and a second fluid stream passage, wherein gas pressure in the second fluid stream passage is higher than gas pressure in the first fluid stream passage. A test gas is supplied to the second fluid stream passage and a test liquid is supplied to the first fluid stream passage. A parameter indicative of flow rate of the test gas exiting the first fluid stream passage is measured as the test liquid fills the first fluid stream passage. An apparatus for locating an internal transfer leak in a fuel cell stack is also provided.

20 Claims, 2 Drawing Sheets

Figure 1:
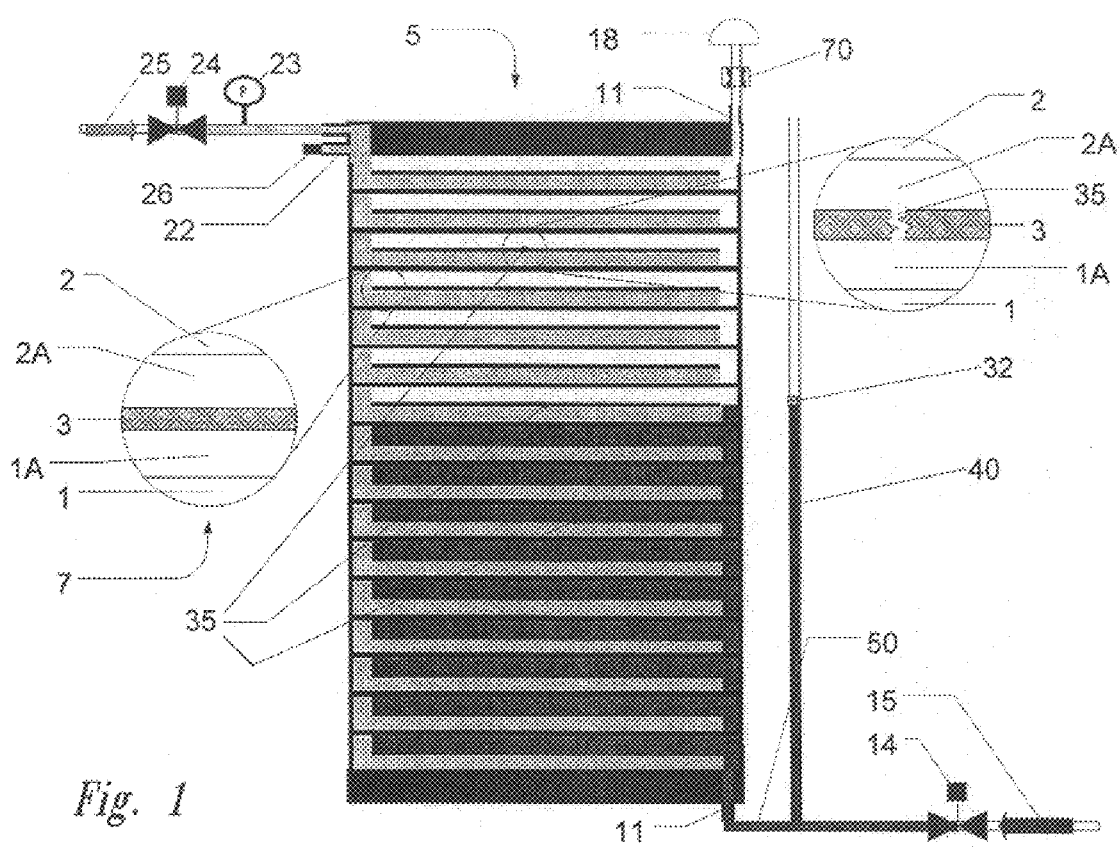

METHOD AND APPARATUS FOR LOCATING INTERNAL TRANSFER LEAKS WITHIN FUEL CELL STACKS

BACKGROUND OF THE INVENTION

1. Field of the Invention

The present invention relates to locating leaks in fuel cell devices. In particular, the invention provides a method and apparatus for locating internal transfer leaks in a solid polymer fuel cell stack.

2. Background of the Invention

Electrochemical fuel cells convert reactants, namely fuel and oxidant, to generate electric power and reaction products. Electrochemical fuel cells generally employ an electrolyte disposed between two electrodes, namely a cathode and an anode. The electrodes generally each comprise a porous, electrically conductive sheet material and an electrocatalyst disposed at the interface between the electrolyte and the electrode layers to induce the desired electrochemical reactions. The location of the electrocatalyst generally defines the electrochemically active area.

Solid polymer fuel cells typically employ a membrane electrode assembly ("MEA") consisting of a solid polymer electrolyte or ion exchange membrane disposed between two electrode layers. The membrane, in addition to being ion conductive (typically proton conductive) material, also acts as a barrier for isolating the reactant (i.e. fuel and oxidant) streams from each other.

The MEA is typically interposed between two separator plates, which are substantially impermeable to the reactant fluid streams, to form a fuel cell assembly. The plates act as current collectors, provide support for the adjacent electrodes, and typically contain flow field channels for supplying reactants to the MEA or circulating coolant. The plates, which include the flow field channels, are typically known as flow field plates. The fuel cell assembly is typically compressed to ensure good electrical contact between the plates and the electrodes, as well as good sealing between fuel cell components. A plurality of fuel cell assemblies may be combined electrically, in series or in parallel, to form a fuel cell stack. In a fuel cell stack, a plate may be shared between two adjacent fuel cell assemblies, in which case the plate also separates the fluid streams of the two adjacent fuel cell assemblies. Such plates are commonly referred to as bipolar plates and may have flow channels for directing fuel and oxidant, or a reactant and coolant, on each major surface, respectively.

The fuel stream that is supplied to the anode separator plate typically comprises hydrogen. For example, the fuel stream may be a gas such as substantially pure hydrogen or a reformate stream containing hydrogen. Alternatively, a liquid fuel stream such as aqueous methanol may be used. The oxidant stream, which is supplied to the cathode separator plate, typically comprises oxygen, such as substantially pure oxygen, or a dilute oxygen stream such as air.

The electrochemical reactions in a solid polymer fuel cell are generally exothermic. Accordingly, a coolant is typically also used to control the temperature within a fuel cell assembly to prevent overheating. Conventional fuels cells employ a liquid, such as, for example, water to act as a coolant. In conventional fuel cells, the coolant stream is fluidly isolated from the reactant streams.

Thus, conventional fuel cells typically employ three fluid streams, namely fuel, oxidant, and coolant streams, which are fluidly isolated from one another. See, for example, U.S. Pat. No. 5,284,718 and U.S. Pat. No. 5,230,966, which are incorporated herein by reference in their entirety.

Fluid isolation is important for several reasons. One reason for fluidly isolating the fuel and oxidant streams from one another in a fuel cell is that hydrogen and oxygen are particularly reactive with each other. Accordingly, the membrane and plates are, therefore, substantially impermeable to hydrogen and oxygen.

One reason for fluidly isolating the coolant fluid from the reactant fluids is to prevent dilution and contamination of the reactant streams. Indeed, water, which is typically used as a coolant, may cause flooding in the reactant fluid passages that prevents the reactants from reaching the electrochemically active membrane-electrode interface. It is also undesirable for the reactant streams to leak into the coolant stream because this reduces operating efficiency as the leaked reactants are not used to generate electrical power. One reason for preventing leakage of any of the fluids to the surrounding atmosphere is the general negative impact such leakage can have on fuel cell stack safety, performance and longevity.

Locating the source of internal transfer leaks has been found to be problematic. Once an internal transfer leak has been detected within a fuel cell stack (which is typically detected through the constant monitoring of the exhaust streams), locating the source of the leak is typically accomplished by disassembling the fuel cell stack into its constituent parts and testing each fuel cell individually. Such method is time consuming and, consequently, expensive. Furthermore, because the disassembling and individual fuel cell testing process can cause further damage/defects to the stack, such method can result in a worsening of a fuel cell stack fluid integrity.

Accordingly, there is a general need for a method and apparatus for locating internal transfer leaks which does not require a fuel cell stack to be disassembled into its constituent parts and each part being tested individually.

BRIEF SUMMARY OF THE INVENTION

The invention provides a method for locating an internal transfer leak in a fuel cell stack. The method comprises:

a) applying a substantially constant gas pressure difference between a first fluid stream passage and a second fluid stream passage, wherein gas pressure in the second fluid stream passage is higher than gas pressure in the first fluid stream passage;

b) supplying a test gas to the second fluid stream passage;

c) supplying a test liquid to the first fluid stream passage; and d) measuring a parameter indicative of flow rate of the test gas exiting the first fluid stream passage as the test liquid fills the first fluid stream passage.

The method may further comprise the step of ascertaining the position of the test liquid inside the first fluid stream passage. In one embodiment, this step comprises splitting a flow of test liquid so as to supply the test liquid to the first fluid stream passage and to a level indicator. As a result, the position of the test liquid within the level indicator is indicative of the position of the test liquid inside the first fluid stream passage.

The method may further comprise positioning the fuel cell stack so that individual fuel cell assemblies are aligned along substantially vertically successive horizontal planes.

In an embodiment of the method, the fluid stream passages are reactant stream passages. In another embodiment of the invention, one fluid stream passage is a reactant stream passage and the other fluid stream passage is a coolant stream passage.

In an embodiment of the method, the parameter indicative of flow rate is flow rate of the test gas. For example, in an embodiment where the test gas is air, the method may comprise measuring the flow rate of air exiting the first fluid stream passage as the test liquid fills the first fluid stream passage.

In an alternative embodiment of the method, the parameter indicative of flow rate of the test gas is concentration of the test gas, or component thereof. For example, in an embodiment where the test gas is hydrogen, the method may comprise measuring hydrogen concentration in the air exiting the first fluid stream passage as the test liquid fills the first fluid stream passage.

In an alternative embodiment of the method, the parameter indicative of flow rate of the test gas is flow rate of all gases. For example, in an embodiment where the test gas is hydrogen, the method may comprise measuring flow rate of all gases exiting the first fluid stream passage as the test liquid fills the first fluid stream passage.

In an embodiment of the method, the gas pressure inside the second fluid stream passage is kept substantially constant.

In an embodiment of the method, the gas pressure inside the first fluid stream passage is kept substantially constant at ambient atmospheric pressure.

The invention also provides a further method for locating an internal transfer leak between an oxidant stream passage and a fuel stream passage of a fuel cell stack. The method comprises:

a) positioning the fuel cell stack so that water directed to the fuel stream passage fills channels of fuel flow field plates in successive individual fuel cell assemblies;

b) directing air to the oxidant stream passage;

c) maintaining gas pressure inside the oxidant stream passage at a substantially constant value greater than ambient atmospheric pressure;

d) maintaining gas pressure inside the fuel stream passage substantially constant at ambient atmospheric pressure;

e) directing water to the fuel stream passage;

f) measuring flow rate of air exiting the fuel stream passage as the water fills the fuel stream passage; and g) ascertaining a water level position inside the fuel stream passage as the water fills the fuel stream passage.

The further method may further comprise relating the flow rate of air measured to the water level position ascertained as the water fills the fuel stream passage.

In an embodiment of the further method, the step of ascertaining the water level position comprises splitting an input flow of water so as to supply the water to the fuel stream passage and to a level indicator, wherein a first water level within the level indicator corresponds to a second water level inside the fuel stream passage.

The invention also provides an apparatus for locating an internal transfer leak in a fuel cell stack. The apparatus comprises:

a) a liquid supply system adapted to supply a test liquid to a first fluid stream passage;

b) a gas supply system adapted to supply a test gas to a second fluid stream passage; and c) a measuring instrument adapted to measure a parameter indicative of flow rate of the test gas exiting the first fluid stream passage as the test liquid fills the first fluid stream passage.

The apparatus may further comprise a regulating system adapted to maintain a substantially constant gas pressure difference between the first fluid stream passage and the second fluid stream passage, wherein gas pressure in the second fluid stream passage is higher than gas pressure in the first fluid stream passage.

In one embodiment of the apparatus, the regulating system may be adapted to maintain the gas pressure in the second fluid stream passage substantially constant. In this embodiment, the regulating system may comprise:

a) a first entry valve, adapted to regulate flow of the test gas to the second fluid stream passage;

b) a relief valve, adapted to allow the test gas to escape from the second fluid stream passage; and c) a pressure transducer, adapted to measure the gas pressure within the second fluid stream passage.

In an alternative embodiment of the apparatus, the regulating system may be adapted to maintain the gas pressure in the first fluid stream passage substantially constant at ambient atmospheric pressure. In this embodiment, the regulating system may comprise an atmospheric isolator, securable to an outlet of the first fluid stream passage and adapted to maintain the gas pressure within the first fluid stream passage substantially constant at ambient atmospheric pressure.

In an embodiment of the apparatus, the measuring instrument may be a gas flow meter. For example, in an embodiment where the test gas is air, the measuring instrument could be an air flow meter.

In an alternative embodiment of the apparatus, the measuring instrument may be an emission analyzer adapted to measure a concentration of the test gas or component thereof. For example, in an embodiment where the test gas is hydrogen, the measuring instrument could be a sensor able to detect hydrogen concentration in air.

In an alternative embodiment of the apparatus, the apparatus may further comprise a level indicator fluidly connected to the liquid supply system and indicative of position of the test liquid inside the first fluid stream passage.

In an embodiment of the apparatus, the level indicator may comprise:

a) a Y-shape connector, adapted to:
  i) receive a flow of test liquid from the liquid supply system, and
  ii) direct the flow of the test liquid:
    a. to the first fluid stream passage, and
    b. to a container;

b) the container, adapted so that position of the test liquid within the container is indicative of position of the test liquid inside the first fluid stream passage.

Many specific details of certain embodiments of the invention are set forth in the detailed description below to provide a thorough understanding of such embodiments. One skilled in the art, however, will understand that the present invention may have additional embodiments, or may be practiced without several of the details described.

BRIEF DESCRIPTION OF THE DRAWING(S)

Figure 2:
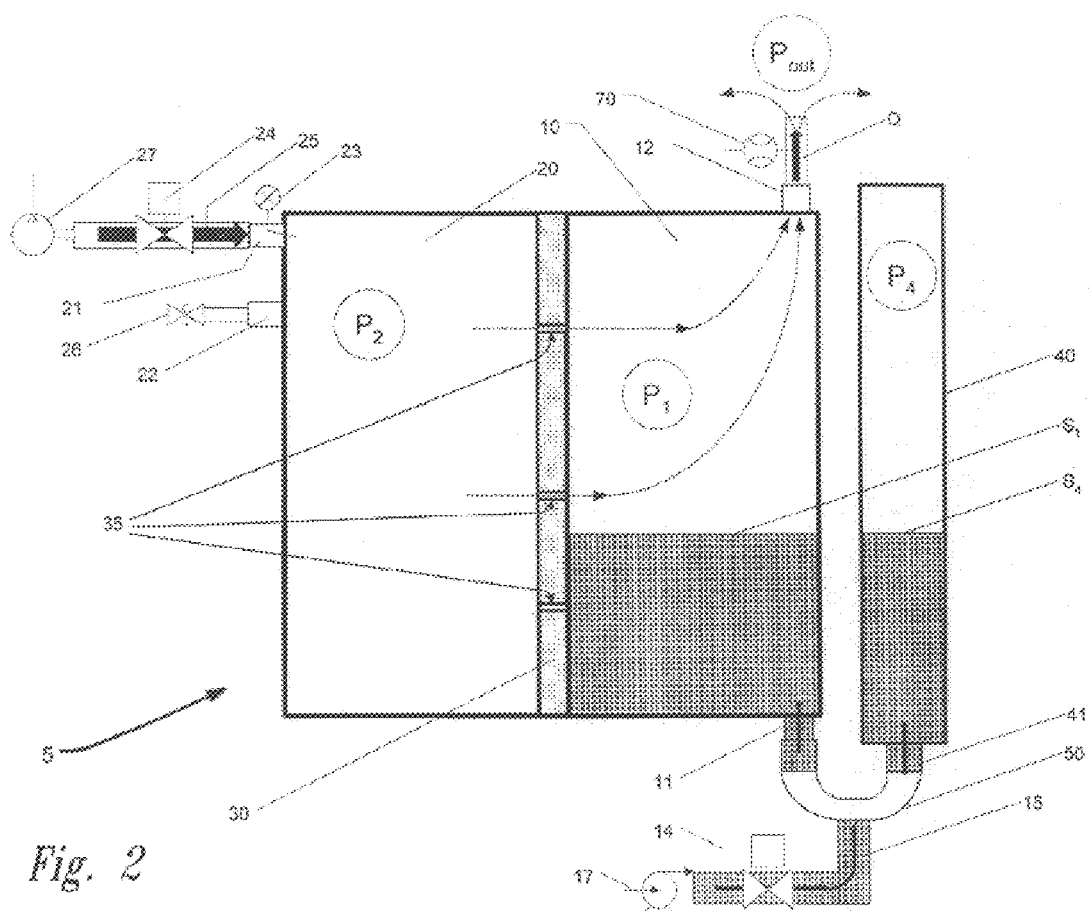

FIG. 1 shows a schematic representation of a fuel cell stack upon and an apparatus for locating internal transfer leaks therein; and FIG. 2 is another schematic representation of the apparatus of FIG. 1.

DETAILED DESCRIPTION OF PREFERRED EMBODIMENT

The present method allows solid polymer electrolyte fuel cells in a fuel cell stack to be checked for internal transfer leaks and for such leaks to be located prior to the fuel cell stack being put into operation (for example, after assembly or during routine maintenance). Leaks between the fuel and oxidant flow passages or between the coolant flow passage and one, or both, of the reactant flow passages are generally known as internal transfer leaks. Leaks that result in fuel, oxidant or coolant escaping from the fuel cell stack to the surrounding environment are generally known as external leaks.

Referring to both FIGS. 1 and 2, which are different schematic representations of essentially the same apparatus, fuel cell stack 5 comprises a plurality of fuel cell assemblies. An individual fuel cell assembly 7 comprises a fuel flow field plate 1 and an oxidant flow field plate 2, separated by an MEA 3. Fuel flow field channels 1A supply fuel to MEA 3. Oxidant flow field channels 2A supply oxidant to MEA 3. Fuel flow field channels 1A are fluidly connected to one another, forming a fuel stream passage 10 through stack 5. Similarly, oxidant flow field channels 2A are fluidly connected to one another, forming an oxidant stream passage 20 through stack 5. Both fuel stream passage 10 and oxidant stream passage 20 are schematically represented in FIG. 2. FIG. 2 also shows schematic MEA 30, representing all MEAs 3 of fuel cell stack 5, which is interposed between fuel stream passage 10 and oxidant stream passage 20. Neither coolant flow fields nor a coolant stream passage are shown in FIGS. 1 and 2. However, it is understood that a number of coolant flow fields, forming a coolant stream passage, may be present in fuel cell stack 5, and that the apparatus and method described can be applied to detect and locate internal transfer leaks between coolant and reactant flow passages.

During normal operation of fuel cell stack 5, fuel is directed to fuel stream passage 10 via inlet port 11 and exits via outlet port 12; oxidant is directed to oxidant stream passage 20 via inlet port 21 and exits via outlet port 22. As shown in FIG. 1, a number of MEAs 3 may comprise a defect 35 which causes an internal transfer leak to occur between fuel flow field channels 1A and oxidant flow field channels 2A of relevant fuel cell assembly 7, thereby leading to an internal transfer leaks between fuel stream passage 10 and oxidant stream passage 20 (as shown schematically in FIG. 2). The method can be used to locate which MEA(s) 3 comprise(s) a defect 35.

Oxidant stream passage 20 is filled with a test gas 25 (which, in the current embodiment, is air), until a set gas pressure differential $P_2-P_1$, between oxidant stream passage 20 and fuel stream passage 10, is achieved. Such pressure differential $P_2-P_1$ is thereafter kept substantially constant throughout the operation of the method, more specifically throughout the filling of fuel stream passage 10 with a test liquid 15 (such filling being explained in more detail below). Any gas pressure differential $P_2-P_1$, which results in test gas 25 flowing from oxidant stream passage 20 through defect(s) 35 into fuel stream passage 10, but does not damage components of fuel cell stack 5, is appropriate. As a result, gas pressure $P_2$ should be higher than gas pressure $P_1$, gas pressure differential $P_2-P_1$ should not exceed a differential critical value beyond which MEA 3 would suffer damage and neither gas pressure $P_2$ nor gas pressure $P_1$ should exceed an absolute critical value beyond which any component of fuel cell stack 5 would suffer damage.

Gas pressure $P_{out}$ is gas pressure outside of outlet port 12. Gas pressure differential $P_1-P_{out}$ is also kept constant throughout the operation of the method. Any gas pressure differential $P_1-P_{out}$, which results in test gas 25 flowing out of fuel stream passage 10 via outlet port 12, but does not damage any component of fuel cell stack 5, is appropriate pursuant to this method. In order to simplify the method, gas pressure $P_1$ and gas pressure $P_{out}$ are both kept substantially constant at ambient atmospheric in the current embodiment. Both gas pressure $P_1$ and gas pressure $P_{out}$ are kept substantially constant at ambient atmospheric pressure by leaving outlet port 12 open to the surrounding ambient atmosphere (which pressure is assumed to be constant). In order to ensure that gas pressure $P_1$ does not vary as a result of activity near outlet port 12, outlet port 12 is fitted with a device, such as an atmospheric isolator 18, which minimizes disturbance from atmospheric wind and/or temporary pressure changes; alternatively, outlet port 12 could be fitted with tubing of sufficient length to ensure that pressure $P_1$ and gas pressure $P_{out}$ are kept substantially constant. However, as indicated above, any gas pressure differential $P_1-P_{out}$, which results in test gas 25, flowing from oxidant stream passage 20 through defects 35 into fuel stream passage 10, and thereafter flowing from fuel stream passage 10 through outlet port 12 and out of fuel cell stack 5, without damaging fuel cell stack 5, is appropriate pursuant to the current method.

Flow rate Q of test gas 25 exiting fuel cell stack 5 via outlet port 12 is then ascertained. In the current embodiment of the method, with test gas 25 being air, outlet port 12 is fitted with a flow meter 70 which calculates flow rate of air exiting through outlet port 12. Because gas pressure differentials $P_2-P_1$ and $P_1-P_{out}$ remain substantially constant (in the current embodiment of the method $P_1=P_{out}$=ambient atmospheric pressure), flow rate Q of test gas 25 measured before test liquid 15 starts filling fuel stream passage 10 (a step to be explained further below) will be substantially constant. Measurement of flow rate Q preferably continues throughout the operation of the method, more specifically as test liquid 15 is filling fuel stream passage 10.

Test liquid 15, which in the current embodiment is water, is then directed to inlet port 11, thereby filling fuel stream passage 10, one individual fuel cell assembly 7 at a time. In the current embodiment of the method, test liquid 15 fills fuel stream passage 10 in a step-wise manner; more specifically flow of test liquid 15 is interrupted after the filling of an individual fuel cell assembly 7 to enable a user to measure flow rate Q of test gas 25 (i.e. flow of test liquid 15 being interrupted when surface $S_1$ has flooded a new fuel cell assembly 7). A user of the method would therefore ascertain the value of flow rate Q of test gas 25 as each individual fuel cell assembly 7 of fuel cell stack 5 is filled. Alternatively, test liquid 15 can fill fuel stream passage 10 continuously without interruptions, with flow rate Q of test gas 25 being measured continuously. As test liquid 15 fills fuel stream passage 10, flow rate Q of test gas 25 exiting through outlet port 12 would be ascertained in relation to position of surface $S_1$ of test liquid 15 inside fuel stream passage 10.

In the current embodiment of the method, position of surface $S_1$ of test liquid 15 inside fuel stream passage 10 is ascertained by filling, simultaneously in parallel to fuel stream passage 10, a transparent tube 40 positioned vertically parallel to fuel cell stack 5. Filling of fuel stream passage 10 and tube 40 is accomplished by splitting the flow of test liquid 15 and directing it to both devices simultaneously. More specifically, the flow of test liquid 15 is directed to an inlet of a Y-shaped connector 50, with Y-shaped connector 50's outlets being connected to inlet port 11 and inlet 41 of tube 40. Gas pressure $P_4$ within tube 40 is the same as gas pressure $P_1$ within fuel stream passage 10; more specifically, as gas pressure $P_1$ is kept substantially constant at ambient atmospheric pressure, so is gas pressure $P_4$ (which is accomplished in the current embodiment by leaving the upper end of tube 40 open to the surrounding ambient atmosphere; as the upper end of tube 40 is of sufficient length, gas pressure $P_4$ is kept substantially constant at ambient atmospheric pressure). As a result, as shown in FIG. 2, position of surface $S_1$ of test liquid 15 inside fuel stream passage 10 and position of surface $S_4$ of test liquid 15 inside tube 40 are the same. It is therefore possible to identify position of surface $S_1$ of test liquid 15 inside fuel stream passage 10 by identifying position of surface $S_4$ of test liquid 15 inside tube 40.

In the current embodiment of the method, fuel cell stack 5 is positioned so that individual fuel cell assemblies 7 are aligned along successive horizontal planes and so that inlet port 11 is located vertically lower than outlet port 12. Consequently, as test liquid 15 is directed to fuel stream passage 10 via inlet port 11, flooding will occur one individual fuel cell assembly 7 at a time in a vertically upward direction. Furthermore, test gas 25 in fuel stream passage 10 is naturally discharged through outlet port 12 as test liquid 15 gradually fills fuel stream passage 10 (movement of test gas 25 is schematically shown in FIG. 2 by dashed arrows).

When an MEA 3 containing a defect 35 is flooded with test liquid 15, the flow rate of test gas 25 entering fuel stream passage 10 from oxidant stream passage 20 changes, resulting in a consequential reduction of flow rate Q of test gas 25 exiting through outlet port 12. The extent of the disruption will depend on test liquid 15's hydrostatic pressure $H_{35}$ in the vicinity of defect 35. In cases where hydrostatic pressure $H_{35}$ exceeds gas pressure $P_2$, test gas 25 will no longer flow through relevant defect 35, thereby resulting in a permanent reduction in flow rate of test gas 25 entering fuel stream passage 10 (and consequently also reducing measured flow rate Q of test gas 25 exiting through outlet port 12). In cases where hydrostatic pressure $H_{35}$ is less than gas pressure $P_2$, test gas 25 will still be able to flow through relevant defect 35, bubbling up to surface $S_1$ of test liquid 15 inside fuel stream passage 10, but will do so at a reduced rate; again, this will have the consequence of reducing flow rate of test gas 25 entering fuel stream passage 10 and consequently also reducing measured flow rate Q of test gas 25 exiting through outlet port 12.

Consequently, identifying an MEA 3 containing a defect 35 is accomplished by identifying an individual fuel cell assembly 7 which is being flooded when flow rate Q of test gas 25 exiting through outlet port 12 registers an anomalous decrease. A significant factor in the magnitude of decrease in flow rate Q measured is the size of defect 35 in relevant defective MEA 3: the larger defect 35 is, the more test gas 25 flows through it, the greater the proportional reduction in flow rate Q measured occurs when test gas 25 flowing through such defect 35 is disrupted/interrupted.

From the foregoing it will be appreciated that, although a specific embodiment of the method has been described herein for purposes of illustration, various modifications may be made without deviating from the spirit and scope of the method.

For example, the steps of the present method need not be performed in the exact order disclosed above. For example, it is possible to pressurize oxidant stream passage 20 before or after positioning fuel cell stack 5.

Another example relates to the fact that the present method is not limited to locating the source(s) of internal transfer leaks between fuel stream passage 10 and oxidant stream passage 20. The present method can assist in locating the source(s) of transfer leaks between any two fluid stream passages within fuel cell stack 5. For example, in order to locate the source(s) of internal transfer leaks between the coolant stream passage and oxidant stream passage 20, instead of directing test liquid 15 to fuel stream passage 10 and measuring flow rate Q of test gas 25 exiting through outlet port 12, test liquid 15 would be directed to the coolant stream passage and flow rate Q of test gas 25 exiting through coolant stream passage outlet port would be measured.

Another example relates to test gas 25 and flow rate Q of test gas 25 exiting through outlet port 12 measured. The nature of test gas 15 to be used is not critical to the present method and persons skilled in the art can readily choose a suitable test gas for a given application. Furthermore, because the method is concerned with identifying anomalous decrease(s) in flow rate Q of test gas 25 exiting through outlet port 12, other parameters, indicative of flow rate, can be measured and persons skilled in the art can readily choose suitable measuring parameters, indicative of flow rate, for a given application. In the described embodiment, test gas 25 is air and flow rate Q of test gas 25 exiting through outlet port 12 measured is air flow rate. It is possible to replace air with hydrogen and to measure percentage of hydrogen present in the air exiting through outlet port 12; in such an example, a user would identify anomalous decrease(s) in percentage of hydrogen present in the air exiting through outlet port 12 as test liquid 15 fills fuel stream passage 10.

Another example relates to the determination of position of surface $S_1$ of test liquid 15 inside fuel stream passage 10. The current embodiment accomplishes this by filling, in parallel to fuel stream passage 10, a transparent tube 40 positioned vertically parallel to fuel cell stack 5. It would also be possible pursuant to this method, to extrapolate position of surface $S_1$ of test liquid 15 inside fuel stream passage 10 by closely monitoring input flow of test liquid 15, thereby obviating the need for tube 40. This alternate embodiment would however not be as accurate if hydrostatic pressure $H_{35}$ exceeds gas pressure $P_2$, because portions of test liquid 15 would migrate into oxidant stream passage 20.

As outlined above, the method can be used to locate internal transfer leak(s) between fluid stream passages, for example leaks occurring between reactant streams through an MEA. The method can also be used to locate leaks occurring between reactant streams, or between a reactant stream and a coolant stream, through a crack in a flow field plate.

In the current embodiment, the method is used to locate internal transfer leak(s) within a fuel cell stack. The method could be performed on other multi-fluid stream passage devices where isolation of such passages from one another is desired, such as fuel cell power plant humidifiers.

An apparatus to locate internal transfer leaks within a fuel cell stack is also provided. An embodiment of the apparatus is described in the subsequent paragraphs. Reference will be made to FIG. 1, which shows an embodiment of the apparatus, and to FIG. 2, which is another schematic representation of the apparatus.

An embodiment of the apparatus comprises a pressurized gas supply system adapted to apply a constant gas pressure difference between oxidant stream passage 20 and fuel stream passage 10, wherein gas pressure in oxidant stream passage 20 is higher than gas pressure in fuel stream passage 10, and wherein oxidant stream passage 20 is filled with test gas 25, which in the current embodiment is air. More specifically, the current embodiment of the pressurized gas supply system comprises:

a) a gas compressor 27 adapted to provide a flow of compressed air (as test gas 25, in the current embodiment, is air) to oxidant inlet port 21, b) a test gas entry valve 24 adapted to regulate the flow of compressed air to oxidant inlet port 21 and to receive operational commands from a processing unit 60, c) a test gas relief valve 26 adapted to allow air to escape from oxidant stream passage 20 and to receive operational commands from processing unit 60, d) a pressure transducer 23 adapted to measure gas pressure within oxidant stream passage 20 and to send gas pressure information to processing unit 60, e) atmospheric isolator 18 which, as outlined above, is adapted to maintain gas pressure within fuel stream passage 10 constant at ambient atmospheric pressure, and f) processing unit 60.

Processing unit 60 is connected to pressure transducer 23, entry valve 24 and relief valve 26. Processing unit 60 is adapted to maintain gas pressure within oxidant stream passage 20 substantially constant (as gas pressure within fuel stream passage 10 remains constant, processing unit 60 in effect maintains gas pressure differential, between oxidant stream passage 20 and fuel stream passage 10, constant). More specifically, when pressure transducer 23 detects that gas pressure within oxidant stream passage 20 is less than $P_2$, processing unit 60 directs entry valve 24 to increase flow of test gas 25 entering oxidant stream passage 20. Conversely, when pressure transducer 23 detects that gas pressure within oxidant stream passage 20 is greater than $P_2$, processing unit 60 directs relief valve 26 to open and let flow of test gas 25 exit oxidant stream passage 20. At equilibrium (i.e. when gas pressure within oxidant stream passage 20 is at $P_2$), a certain flow of test gas 25 typically enters entry valve 24 (to compensate for amount of test gas 25 migrating through defects 35) and relief valve 26 is closed.

The embodiment of the apparatus further comprises a liquid supply system adapted to provide a flow of test liquid 15, which in the current embodiment is water, to fuel stream passage 10. More specifically, the liquid supply system comprises:

a) a pump 17 adapted to provide a flow of water to fuel inlet port 11; and b) an entry valve 14 adapted to regulate the flow of water to fuel inlet port 11.

The embodiment of the apparatus further comprises a measuring instrument adapted to measure flow of test gas 25 out of fuel stream passage 10, as test liquid 15 fills the first fluid stream passage. More specifically, the liquid supply system comprises a flow meter 70 which calculates flow rate of air exiting through outlet port 12. Alternatively, when a gas other than air is used as test gas 25, an emission analyzer, adapted to measure the test gas itself, a concentration of the test gas in air or other parameter indicative of flow of test gas 25 exiting through outlet port 12), could be used.

The embodiment of the apparatus further comprises a level indicator adapted to ascertain the position of surface $S_1$ of test liquid 15 inside fuel stream passage 10. Further specifics on the level indicator in the current embodiment of the apparatus is given above.

From the foregoing it will be appreciated that, although a specific embodiment of the apparatus has been described herein for purposes of illustration, various modifications may be made without deviating from the spirit and scope of the present apparatus.

For example, it is possible not to have processing unit 60. In such an embodiment, gas pressure within oxidant stream passage 20 would be maintained constant manually by a user.

Conversely, in another example, it is possible to have processing unit 60 operationally linked to the level indicator so as to link the vertical position of surface $S_1$ of test liquid 15 inside fuel stream passage 10 with flow rate Q measured. In such an alternative embodiment, the level indicator comprises a float position indicator 32 adapted to locate vertical position of surface $S_4$ of test liquid 15 inside tube 40 and to send such information to processing unit 60. Processing unit 60 is adapted to determine the position of surface $S_1$ of test liquid 15 inside fuel stream passage 10 from such information and to link such information to flow rate Q of test gas 25 being measured at the relevant time. Such an alternative embodiment would be useful with respect to an alternative embodiment of the method where test liquid 15 fills fuel stream passage 10 continuously without interruptions, with flow rate Q of test gas 25 being measured continuously. In such an alternative embodiment, processing unit 60 could produce a graph of flow rate Q measured in relation to position of surface $S_1$ within fuel stream passage 10, with a user studying such a graph to find abnormal decreases (i.e. to find location(s) of internal transfer leaks).

In another example, processing unit could be adapted to generate an audible signal any time it detects an anomalous decrease in flow rate Q of test gas 25 exiting through outlet port 12. By visually identifying vertical position of surface $S_4$ of test liquid 15 inside tube 40 (and relating such position to a specific fuel cell assembly 7) when the audible signal is generated, a user would be able to identify defective fuel cell assembly(ies) 7.

In another example, the level indicator could be removed and replaced with an input flow indicator adapted to monitor, on a real-time basis, flow of test liquid 15 to fuel stream passage 10 and adapted to send such information to processing unit 60. In turn, processing unit 60 would be adapted to extrapolate information received from the input flow indicator and relate it to position of surface $S_1$ of test liquid 15 inside fuel stream passage 10.

While particular elements, embodiments and applications of the present method and apparatus have been shown and described herein, it will be understood, of course, that the invention is not limited thereto since modifications may be made by those skilled in the art, particularly in light of the foregoing teachings. It is therefore contemplated by the appended claims to cover such modifications as incorporate those features that come within the scope of the invention.

What is claimed is:

1. A method for locating an internal transfer leak in a fuel cell stack, the method comprising:

a) applying a substantially constant gas pressure difference between a first fluid stream passage and a second fluid stream passage, wherein gas pressure in the second fluid stream passage is higher than gas pressure in the first fluid stream passage;

b) supplying a test gas to the second fluid stream passage;

c) supplying a test liquid to the first fluid stream passage; and d) measuring a parameter indicative of flow rate of the test gas exiting the first fluid stream passage as the test liquid fills the first fluid stream passage, and further comprising the step of ascertaining the position of the test liquid inside the first fluid stream passage.

2. The method of claim 1, wherein the step of ascertaining the position of the test liquid inside the first fluid stream passage comprises splitting a flow of test liquid so as to supply the test liquid to the first fluid stream passage and to a level indicator.

3. The method of claim 2, further comprising positioning the fuel cell stack so that individual fuel cell assemblies are aligned along substantially vertically successive horizontal planes.

4. The method of claim 2, wherein the fluid stream passages are reactant stream passages.

5. The method of claim 1, wherein one fluid stream passage is a reactant stream passage and the other fluid stream passage is a coolant stream passage.

6. The method of claim 1, wherein the test gas is air and the parameter indicative of flow rate of the test gas is air flow rate.

7. The method of claim 1, wherein the parameter indicative of flow rate of the test gas comprises is concentration of the test gas, or component thereof.

8. The method of claim 1, wherein the test gas is hydrogen and the parameter indicative of flow rate of the test gas is hydrogen concentration in air.

9. The method of claim 1, wherein the parameter indicative of flow rate of the test gas is flow rate of all gases exiting the first fluid stream passage.

10. The method of claim 1, wherein the gas pressure inside the first fluid stream passage is kept substantially constant at ambient atmospheric pressure.

11. The method of claim 1, wherein the gas pressure inside the second fluid stream passage is kept substantially constant.

12. An apparatus for locating an internal transfer leak in a fuel cell stack, comprising:
   a) a liquid supply system adapted to supply a test liquid to a first fluid stream passage;
   b) a gas supply system adapted to supply a test gas to a second fluid stream passage;
   c) a measuring instrument adapted to measure a parameter indicative of flow rate of the test gas exiting the first fluid stream passage as the test liquid fills the first fluid stream passage; and
   d) a level indicator fluidly connected to the liquid supply system and indicative of position of the test liquid inside the first fluid stream passage.

13. The apparatus of claim 12, wherein the level indicator comprises:
   a) a Y-shape connector, adapted to:
      i) receive a flow of test liquid from the liquid supply system, and
      ii) direct the flow of the test liquid:
         a. to the first fluid stream passage, and
         b. to a container;
   b) the container, adapted so that position of the test liquid within the container is indicative of position of the test liquid inside the first fluid stream passage.

14. The apparatus of claim 12, further comprising a regulating system adapted to maintain a substantially constant gas pressure difference between the first fluid stream passage and the second fluid stream passage, wherein gas pressure in the second fluid stream passage is higher than gas pressure in the first fluid stream passage.

15. The apparatus of claim 14, wherein the regulating system is adapted to maintain the gas pressure in the second fluid stream passage substantially constant.

16. The apparatus of claim 15, wherein the regulating system comprises:
   a) a first entry valve, adapted to regulate flow of the test gas to the second fluid stream passage;
   b) a relief valve, adapted to allow the test gas to escape from the second fluid stream passage; and
   c) a pressure transducer, adapted to measure the gas pressure within the second fluid stream passage.

17. The apparatus of claim 14, wherein the regulating system is adapted to maintain the gas pressure in the first fluid stream passage substantially constant at ambient atmospheric pressure.

18. The apparatus of claim 14, wherein the regulating system comprises an atmospheric isolator, securable to an outlet of the first fluid stream passage and adapted to maintain the gas pressure within the first fluid stream passage substantially constant at ambient atmospheric pressure.

19. The apparatus of claim 12, wherein the measuring instrument is a gas flow meter.

20. The apparatus of claim 12, wherein the measuring instrument is an emission analyzer adapted to measure a concentration of the test gas or component thereof.

* * * * *

UNITED STATES PATENT AND TRADEMARK OFFICE
CERTIFICATE OF CORRECTION

PATENT NO. : 6,662,633 B2  Page 1 of 1
DATED : December 16, 2003
INVENTOR(S) : Stephen John Pratt It is certified that error appears in the above-identified patent and that said Letters Patent is hereby corrected as shown below:

Column 11,
Line 5, "claim 2" should read as -- claim 1 --.

Signed and Sealed this

Sixth Day of July, 2004

JON W. DUDAS
*Acting Director of the United States Patent and Trademark Office*